US005615937A

United States Patent [19]

Bellanger

[11] Patent Number: 5,615,937

[45] Date of Patent: Apr. 1, 1997

[54] DEVICE FOR THE PROJECTION/REFLECTION OF IMAGES

[76] Inventor: Philippe Bellanger, Domaine des Hayes, F-49250 Brion, France

[21] Appl. No.: 564,240

[22] PCT Filed: Jun. 24, 1994

[86] PCT No.: PCT/FR94/00764

§ 371 Date: Dec. 21, 1995

§ 102(e) Date: Dec. 21, 1995

[87] PCT Pub. No.: WO95/00346

PCT Pub. Date: Jan. 5, 1995

[30] Foreign Application Priority Data

Jun. 28, 1993 [FR] France .................................. 93 08100

[51] Int. Cl.$^{6}$ .................................................... G03B 21/14

[52] U.S. Cl. ............................ 353/97; 353/79; 40/124.5; 40/361

[58] Field of Search ................................. 353/22, 23, 28, 353/97, 1, 2, 120, 79; 40/124.5, 363, 361; 359/616, 617

[56] References Cited

U.S. PATENT DOCUMENTS

| | | | |
|---|---|---|---|
| 1,673,512 | 6/1928 | Hurter | 353/97 |
| 4,227,325 | 10/1980 | Whitford | 40/124.5 |
| 4,231,634 | 11/1980 | Gantz et al. | 353/2 |
| 5,094,525 | 3/1992 | Nelson, Jr. et al. | 353/1 |

FOREIGN PATENT DOCUMENTS

| | | |
|---|---|---|
| 513038 | 10/1980 | Australia . |
| 0522195 | 1/1993 | European Pat. Off. . |
| 2614581 | 11/1988 | France . |
| 2635726 | 3/1990 | France . |

*Primary Examiner*—William Dowling
*Attorney, Agent, or Firm*—Young & Thompson

[57] ABSTRACT

A picture projection/reflection device, particularly for use in a grave marker to optimize the observation of a remembrance picture or informative display. The device consists of a housing (2) for dimming the ambient light (7), and has a light inlet opening (10) at least partially blocked by a light filtering diffuser (6), and a light outlet opening (11) provided with a reflecting member such as a mirror (1). The picture (5) to be projected is at the inlet opening. The device is suitable for grave markers, street furniture, advertising media and the like.

8 Claims, 3 Drawing Sheets

DEVICE FOR THE PROJECTION/REFLECTION OF IMAGES

FIELD OF THE INVENTION

The present invention relates to a device for the projection/reflection of images adapted particularly to be integrated with or disposed adjacent grave markers, street furniture, publicity displays or the like.

The invention is more particularly concerned with a device for illuminating a transparent or translucent image and the remote projection of this image to render it particularly visible to an observer.

BACKGROUND OF THE INVENTION

A certain number of publications disclose devices which integrate on the one hand one or several images in the form of a photograph or the like, on the other hand means for illuminating said image. Thus, the patent EP-A-0 522 195 discloses a device for illuminating an image of a logo placed on the roof of a vehicle, this image being read by means of a reflective device such as a mirror. However, because of the use of this device, in particular on the roof of vehicles, particularly trucks, it is necessary to provide between the image support and the reflecting member a passage forming a conduit for air flow and a largely open front surface. Because of this, it is impossible to dim the ambient light to create a sufficiently dark region forming a contrast with the ambient external region. This lightness-darkness is thus effected at the image in the image plane by light-dark or black-white regions provided by filled and empty regions. Such a device however does not permit the projection of complex images, particularly colored images such as photographs or stained glass.

In the patent AU-B-73.038, there is described an advertising device in the form of a complex monoblock constituted by a transparent screen superposed on an image of logo type, which is covered with a reflecting surface, and is itself covered by a support surface. Such a device does not in any case permit optimum close-up reading of an image.

SUMMARY OF THE INVENTION

The object of the present invention is to provide a device for projecting a luminous image by natural ambient light, such a device permitting optimizing quantitatively the remote reading of a commemorative image or information without being dependent on the medium and without changing the values of the luminous spectrum.

Another object of the invention is to provide a device for reflecting the image which permits obtaining by contrast images permitting very good reading of the image from a distance and with a visual effect agreeable to the eye.

To this end, the invention relates to a device for the projection/reflection of images, for a grave marker, street furniture or the like, to optimize the reading of a commemorative image or an informative image, characterized in that it is constituted principally by a housing having the function of dimming external light, open at points called respectively an inlet opening for light of the housing and an outlet opening for light from the housing, the inlet opening for the housing light being closed at least partially by, or comprising in its vicinity, a diffuser to distribute and if desired to filter the ambient external light intended to pass through an image disposed in, or adjacent to, the inlet opening of the housing light, whilst the outlet opening for light from the housing is closed at least partially by, or provided in its vicinity with, at least one reflecting device, such as a mirror, visible to an observer and from which is reflected the projected image.

According to a preferred embodiment of the invention, the diffuser is incorporated in an image of photographic type developed on a translucent support, the assembly being inserted within a support such as a frame constituted by double glazing.

BRIEF DESCRIPTION OF THE INVENTION

The invention will be better understood from a reading of the following description of embodiments, with reference to the accompanying drawings, in which.

DETAILED DESCRIPTION OF THE INVENTION

Figure 1:
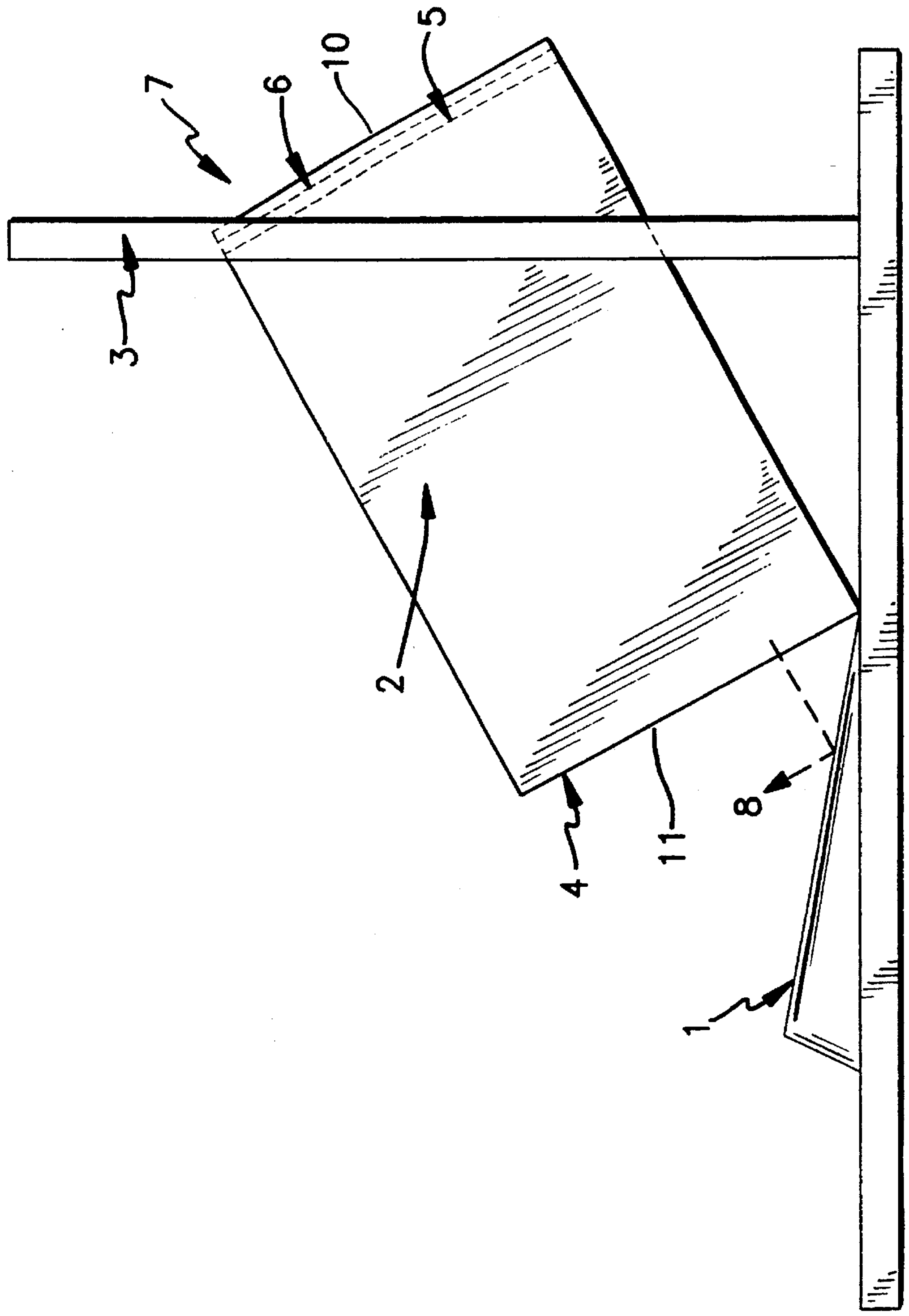
FIG. 1 shows a side view of a projection/reflection device for images according to the invention.
Figure 2:
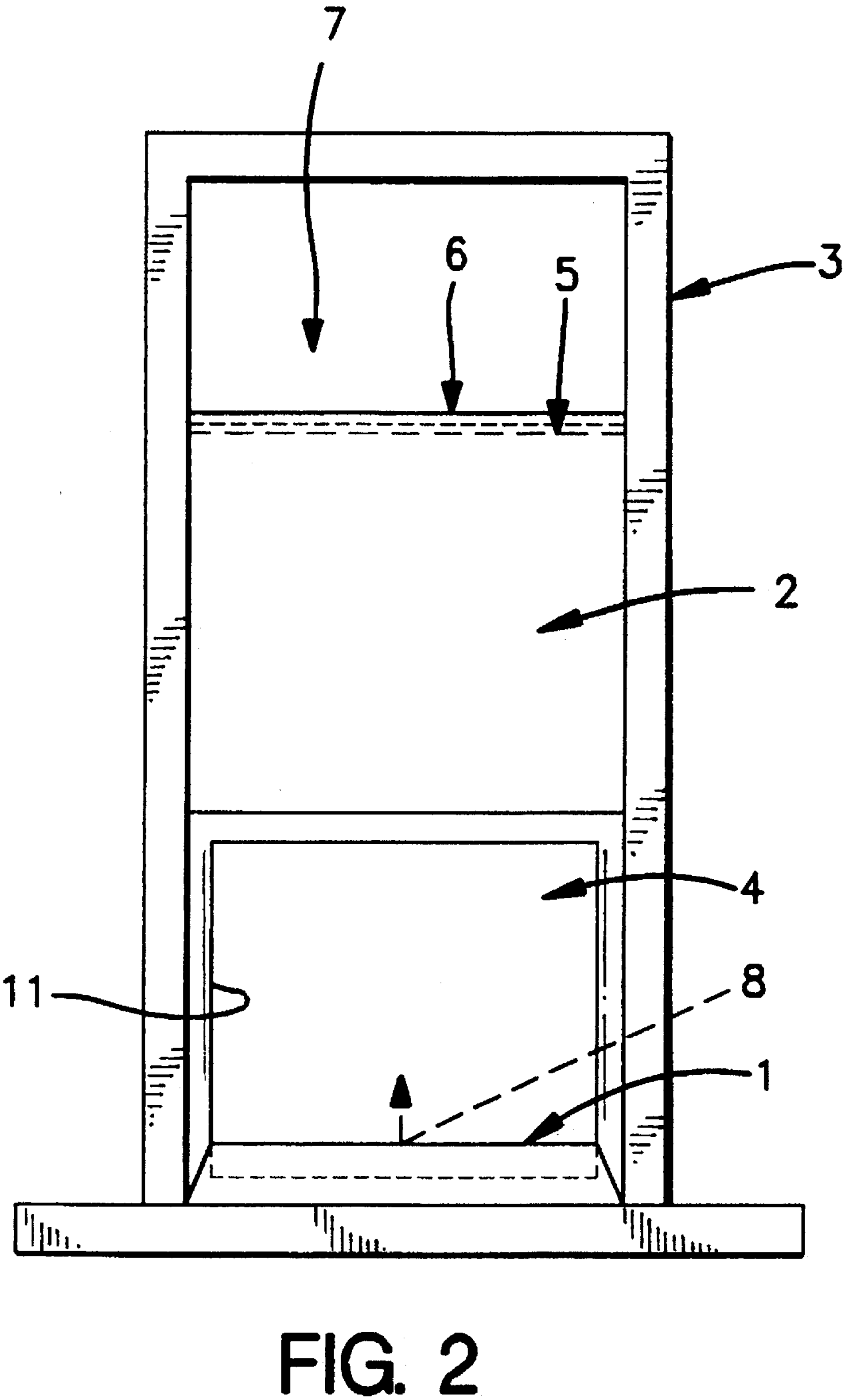
FIG. 2 shows a front view of a device for the projection/reflection of images according to the invention.
Figure 3:
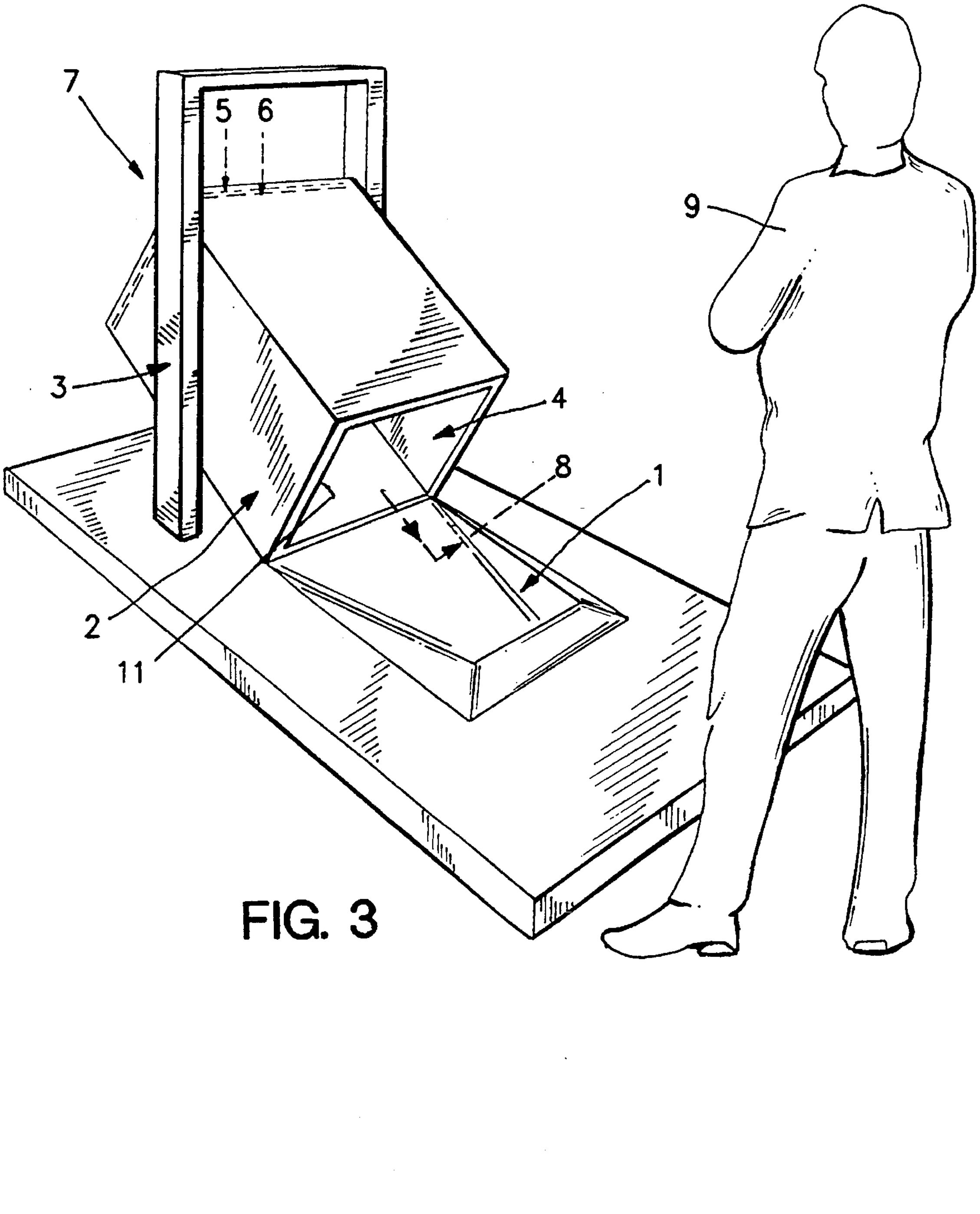
FIG. 3 shows a perspective view of a device for the projection/reflection of images according to the invention integrated into a tombstone.

According to the invention, the device for the projection/reflection of images is adapted to be used in combination with grave markers for example a tomb or street furniture or with an advertising support or alone. In this last case, it could be present in the form of a commemorative object, the projected image corresponding to a countryside, a site, etc. This device could be used in cooperation with any installation in which the image, no matter whether a commemorative image or an informative image, plays an important role. In reality, it is a matter of any installation in which a communication by image is necessary. Independently of its applications and of its uses, the device for the projection/reflection of images, which is the object of the invention, is constituted principally by a housing 2 of any shape having the function of dimming external light 7. This external light can be natural or artificial light. Natural light will be preferred because it does not modify the values of the luminous spectrum and permits provision of a projection device which is very simple and hence less cumbersome. In the examples shown in FIGS. 1 to 3, the housing 2 is present in the form of a parallelepipedal volume but any other shape of embodiment could be used. This housing 2 is open at two points called respectively a light inlet opening 10 of the housing and a light outlet opening 11 of the housing. These inlet and outlet openings 10 and 11 can be positioned anywhere on the housing. The positioning of these openings will determine the positioning of the image 5 which is to be projected and the positioning of the reflective device 1. Thus, the light inlet opening 10 of the housing 2 is closed at least partially by, or comprises in its vicinity, a diffuser 6 to filter external ambient light 7 destined to pass through an image 5, said image 5 being generally translucent or transparent and being disposed in or adjacent the light inlet opening of the housing, such that the light filtered by the diffuser will be received and projected through this image 5. This image 5 could be constituted for example by a colored glass or by a photograph. This photograph could be obtained by well-known techniques of the Duratrans (trademark) or Cibatrans (trademark) type. In this case, these photos are developed on a translucent support. The diffuser is then incorporated with the image. In other embodiments of the invention, the diffuser can be constituted by a filter known per se disposed before the image in the inlet direction of the light into the housing. According to the uses to which the device for the projection/reflection of images is to be put, the image and its diffuser could in particular be protected from harm by a suitable protection device. This protection device could be constituted by a frame, an envelope, a pocket or the like within which the diffuser and the image are incorporated. The simplest solutions are generally constituted by a frame formed by double glazing within which the image and its diffuser are inserted, the frame being then placed in or in the vicinity of the light inlet opening 10 of the housing. The light outlet opening 11 of the housing is itself closed at least partially by, or provided in its vicinity with, at least one reflective device 1, such as a mirror, visible by the observer and from which is reflected the projected image 8. This mirror could therefore be disposed inside of or outside of the housing 2. The housing could be of any material. In the case in which this device is incorporated in a grave marker, the housing will generally be of a material identical to the material used to produce the tombstone.

To avoid condensation within the housing and the effect of drying on housings exposed to the sun, ventilation means will be provided for this housing. By way of example, these ventilation means could be constituted by a baffle disposed adjacent the light inlet opening of the housing obstructing light rays and letting pass hot air that rises by a chimney effect.

As a function of its use, the housing could be positioned by means of a suitable support such as an arch 3. In the examples shown in FIGS. 1 to 3, the device for the projection/reflection of images is integrated in a tombstone. In this case, on the upper surface of the tombstone is disposed flat or slightly inclined the mirror 1. This mirror reflects the image 8 projected within the housing 2 by means of ambient light 7 entering at 10 within the housing and leaving at 11. An observer 9 disposed at one end of the tomb can observe the image projected on the mirror 1. Such a device therefore permits close-up reading of the image. The image is itself positioned at the other end of the housing at 5. Disposed upstream of this image, a diffuser 6 distributes the light passing through this image 5. It is possible that the light outlet opening 11 of the housing can be closed in a supplemental manner by a transparent material 4. This transparent plate is in no case obligatory. The housing 2 is maintained in inclined position relative to the tombstone by means of an arch 3 having a U shape, the cross-piece of the U being surmounted by a cross which completes the monument. In this case, the light inlet opening of the housing 2 is positioned upwardly and the outlet opening 11 for light from the casing is positioned downwardly at any variable inclination from 0° to 180°.

However, large number of other embodiments and positions for the housing can be envisaged. Similarly, the light inlet opening 10 and the light outlet opening 11 of the casing 2 are not obligatorily disposed facing each other. Thus, it is necessary only to be sure that the geometric arrangement of the image 5, the mirror 1, and the eyeline of the observer be in concordance. The interest in such a device resides on the one hand in its simplicity of construction, on the other hand in the quality of the projected image because of the use of natural ambient light. Thus, the fact of using no artificial light source permits respecting the colors by not modifying the temperature and hence the values of the luminous spectrum. Because of this, no loss of the image is suffered. Moreover, on the aesthetic and visual levels, there is obtained a shielding effect for the image because of its light and dark environment; this offers an agreeable visual aspect to the eye whilst permitting personalized and intimate reading of the image.

I claim:

1. Device for the projection and reflection of an image to optimize reading thereof, which comprises:

a housing having the function of dimming external light, open at two points called respectively a light inlet opening of the housing and a light outlet opening of the housing, said light inlet opening of the housing being partially closed by a diffuser for filtering ambient external light which will traverse a transparent image disposed adjacent the light inlet opening of the housing, while said light outlet opening of the housing being provided in its vicinity with a mirror visible to an observer and on which is reflected a projected image to permit remote reading thereof by the observer.

2. Device according to claim 1, wherein the housing is ventilated.

3. Device according to claim 1, wherein the image is a photographic image, and the diffuser is incorporated in the photographic image developed on a translucent support.

4. Device according to claim 1, wherein the diffuser is disposed before the image in an inlet direction from the ambient external light into the interior of the housing.

5. Device according to claim 1, wherein the image is protected from damage by a support, which limits a volume which is at least partially closed and of which at least two surfaces are transparent.

6. Device according to claim 5, wherein the support comprises double glazing to protect the image.

7. Device according to claim 1, wherein the housing is positioned by at least one support means.

8. Device according to claim 1, wherein said device is disposed on an upper surface of a tombstone, said light inlet opening of the housing being positioned upward, and said light outlet opening of the housing being directed downwardly at a variable inclination ranging from 0° to 180°.

* * * * *